United States Patent Office 3,418,820
Patented Dec. 31, 1968

3,418,820
METHOD AND APPARATUS FOR REMOVING
VAPORS FROM GASEOUS MIXTURES BY
FREEZING
Judson S. Swearingen, 500 Bel Air Road,
Los Angeles, Calif. 90024
Filed Nov. 14, 1966, Ser. No. 594,057
5 Claims. (Cl. 62—12)

ABSTRACT OF THE DISCLOSURE

A gaseous stream containing vapors is passed through two heat exchangers. The stream defrosts the first and is cooled sufficiently in the second for the vapors therein to deposit out as frost. When the first is defrosted and the second charged with frost, the order in which the gas passes through the exchangers is reversed to begin defrosting the second and charging the first. Refrigeration for the cooling of the downstream exchanger is obtained by expanding the gas stream to a lower pressure and temperature through a turboexpander. Before switching the order of the exchangers, the expanded stream is passed through the defrosted exchanger to pre-cool it. Also, periodically a portion of the incoming gaseous stream is passed through the turboexpander to remove any frost which may have collected therein.

Figure 1:
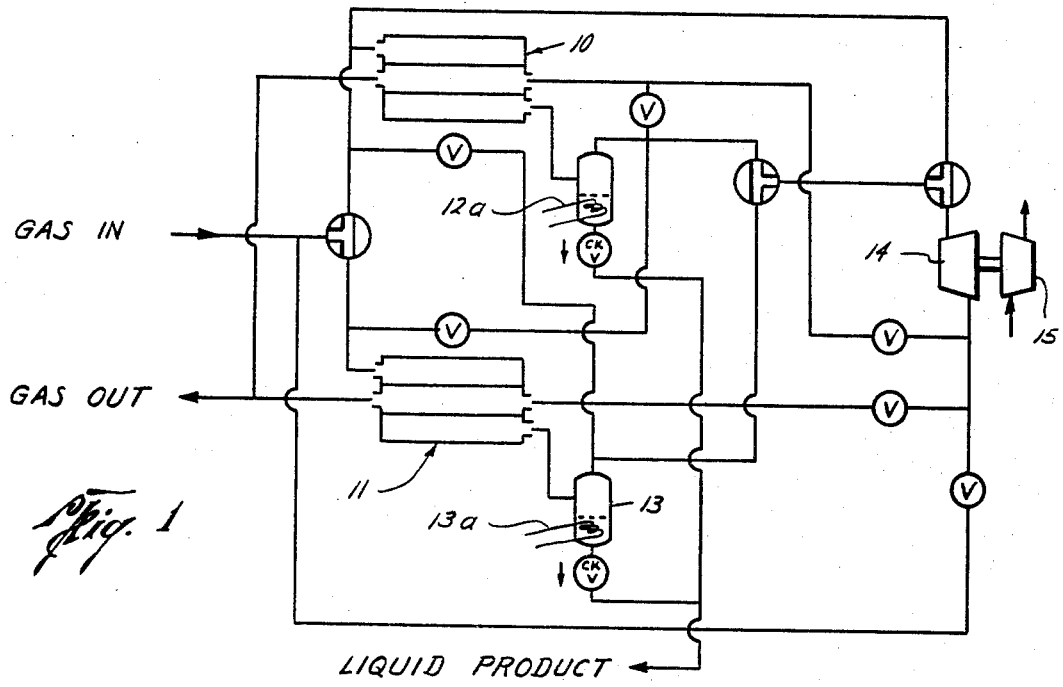

This invention relates generally to an improved method of and apparatus for removing vapors from a gaseous mixture and, in particular, to removing vapors that have a freezing point above the recovery temperature.

The method of this invention removes the vapors from a gaseous stream by cooling the stream to condense the vapors. Some of the vapors are removed as liquid, but others, particularly the hydrates, are deposited as frost on the cold surfaces of the heat exchanger used to cool the gas to below the freezing temperature of the hydrates.

One example of a prior method having a comparable objective is disclosed in the prior patent to Newsome, Jr. No. 2,928,885. Newsome, Jr. describes a method of removing vapors by causing some of them to be collected as frost. In his system, he collects on the coils of his heat exchanger at the cold end for a period, then he reverses the flow through the heat exchanger to heat up the cold end to remove the frost while the end that was previously warm is cooled to continue removing vapor as frost. The vapor not removed in the heat exchanger either as liquid or frost is removed by passing the gas through a pressure reducing valve. The cooled gas downstream of the pressure reducing valve is passed through the heat exchanger to provide the refrigeration required to maintain the cold end at the frost producing temperature.

In Newsome's system, when the cold end of the heat exchanger is being defrosted, there is a period during which the system is not operating efficiently because the previously warm end is not cold enough and no frost is being formed. Further, since Newsome uses a pressure drop to remove a substantial portion of his vapors, a turboexpander cannot be used for this purpose and useful work obtained because the turboexpander would be quickly clogged with frost. Also, the condensation that occurs due to the pressure drop gives up heat to the gas stream thereby increasing the temperature of the gas for a given pressure reduction over that obtained with relatively dry gas.

It is an object of this invention to provide a method of removing vapors from a gaseous stream that includes the step of alternately frost coating or charging a cold surface while defrosting or discharging another in which the defrosted surface can be rechilled to the frost producing temperature before the operation is reversed to start defrosting the other surface.

It is another object of this invention to provide a method of and apparatus for removing vapors from a gaseous stream that removes substantially all of the vapors without reducing the pressure of the stream to permit the stream to be passed through a turboexpander to obtain useful work from the pressure drop as well as refrigeration for the method.

Of course, all vapor will not have been removed from the gas stream before it passes through the turboexpander. Therefore, some frost will slowly build up in it. Therefore, it is another object of this invention to provide a method of and apparatus for removing vapors from a gaseous stream that obtains refrigeration for the process and useful work by passing the stream through a turboexpander, which method and apparatus will periodically defrost the turboexpander without stopping the flow of the gas and without appreciably reducing the efficiency of the method in removing vapors from the gas.

These and other objects, advantages, and features of the invention will be apparent to those skilled in the art from a consideration of this specification, attached drawings, and appended claims.

The invention will now be described in connection with the attached drawings in which:

FIG. 1 is a schematic drawing of the preferred embodiment of the apparatus employed in the practice of this invention, and FIGS. 2–6 are flow diagrams employing the apparatus of FIG. 1, each illustrating a step in the method of this invention.

The apparatus includes first heat exchanger 10 and second heat exchanger 11. Liquid trap or gas-liquid separators 12 and 13 are associated with heat exchangers 10 and 11, respectively. The other major portion of the apparatus is turboexpander 14, which, in the embodiment shown, drives compressor 15. Various pipes and valves are employed to connect these components to perform the various steps of the method of this invention. This equipment will be described in connection with the steps illustrated in FIGS 2 through 6.

Figure 2:
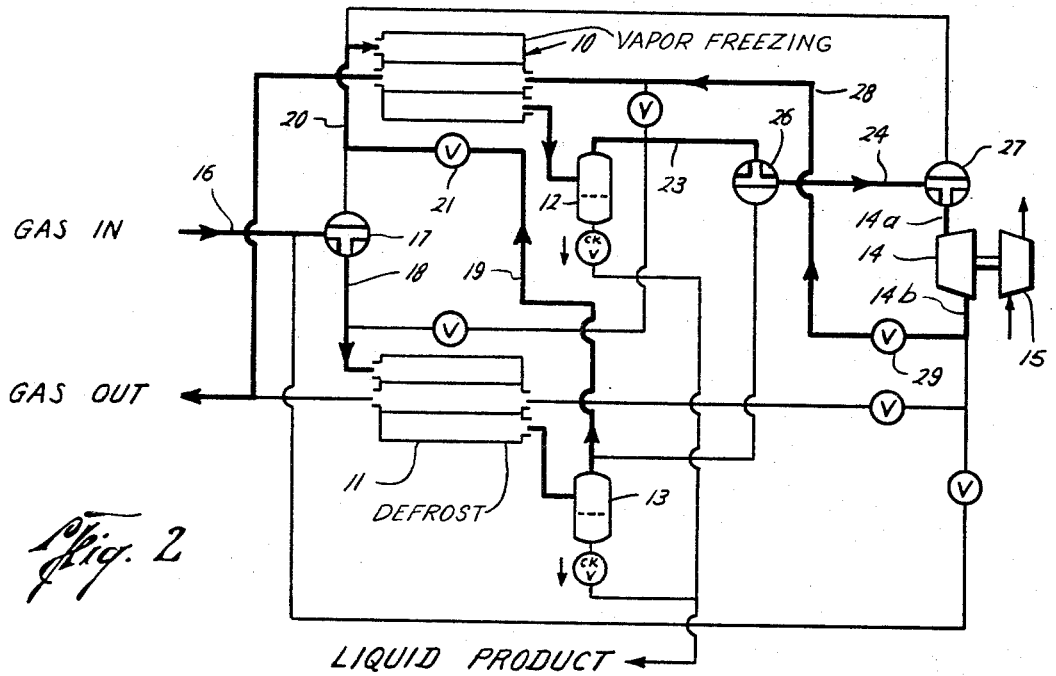

Referring now to FIG. 2, gas enters the system through inlet line 16. The gas stream is directed into the shell side of heat exchanger 11 by three-way valve 17 and line 18. The coil in heat exchanger 11 is coated with the frozen condensate recovered from a gas stream that previously passed through this heat exchanger. The incoming gas stream being relatively warm melts this frost and is cooled, which may cause the condensation of some of the vapor in the stream. The stream passes out of heat exchanger 11 into liquid gas separator 13. There the liquefield frost and the condensed liquid from the gas stream, if any, is separated from the gas. The gas then flows to the shell side of heat exchanger 10, through lines 19 and 20, and valve 21.

As the gas passes through heat exchanger 10, its temperature is lowered to below the freezing level of the vapors to be removed. As the temperature of the gas is lowered, the vapors therein condense and at least a portion collect on the coils of the heat exchanger as frost. The condensate that remains liquid is carried with the gas stream from the heat exchanger into liquid separator 12, where it is removed from the gas stream.

The gas at this point is relatively dry, yet at substantially its input pressure. It now flows from separator 12 to turboexpander 14 through lines 23, 24, and 14a and three-way valves 26 and 27. The pressure of the gas stream is then reduced to lower its temperature by passing it through turboexpander 14. By obtaining this reduction in pressure by using a turboexpander, useful work can be obtained. In the embodiment shown this work is used to drive compressor 15. This compressor can be employed as desired. For example, it can be used to compress the gas stream before it enters the system or to compress the gas stream after it leaves the system.

The gas, as it leaves the turboexpander is very cold. It is passed into the tube side of heat exchanger 10 through expander output line 14b, line 28, and valve 29 to provide refrigeration for lowering the temperature of the gas passing through the shell side of the heat exchanger to a temperature below the freezing point of the vapors being condensed. After passing through heat exchanger 10, the gas is discharged from the system.

As this process continues, the frost in heat exchanger 11 will be removed. At the same time, frost is building up on the coil of heat exchanger 10.

Figure 3:
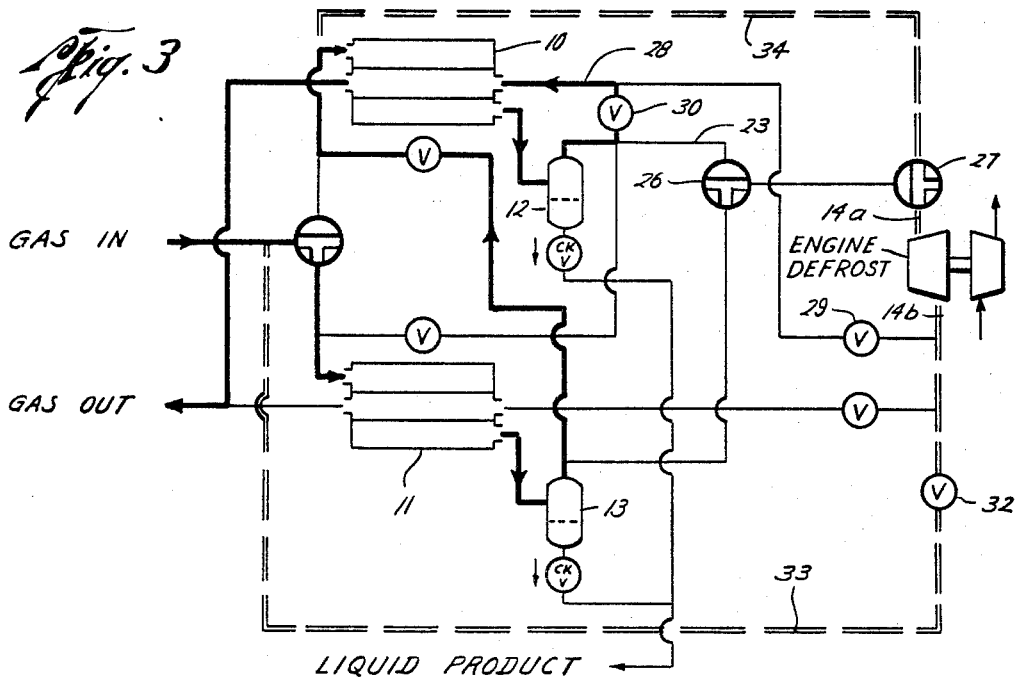

Even though substantially all of the vapor has been removed from the gas stream before it enters the turboexpander, there usually will be some left, which will condense out and slowly build up frost in the turboexpander. Therefore, periodically the frost should be removed from the turboexpander and this step is illustrated in FIG. 3. First valve 29 is closed and valve 30 is opened. Then valve 26 is positioned to divert the gas from separator 12 from the turboexpander directly to heat exchanger 10 through valve 30 and line 28. Valve 30 is provided with an orifice through which the gas stream is expanded to lower its pressure to the pressure in line 28, i.e., the discharge pressure of the turboexpander. This lowers its temperature so that the gas stream will continue to provide refrigeration to cool exchanger 10.

After the gas stream has been so diverted, valve 32 is opened and a portion of the incoming gas stream is diverted through line 33 and output line 14b to the turboexpander. This gas passes through the turboexpander in the reverse direction, where it melts the frost that has collected therein. The gas is then returned, along with the melted frost, to the main gas stream upstream of heat exchanger 10 through input line 14a, valve 27, and line 34. Valve 32 is a restricted flow valve so that only a portion of the gas stream will be diverted through the turboexpander. After the turboexpander has been defrosted or derimed, the process can be returned to that shown in FIG. 2.

This defrosting or deriming of the turboexpander need not occur except when necessary.

Figure 4:
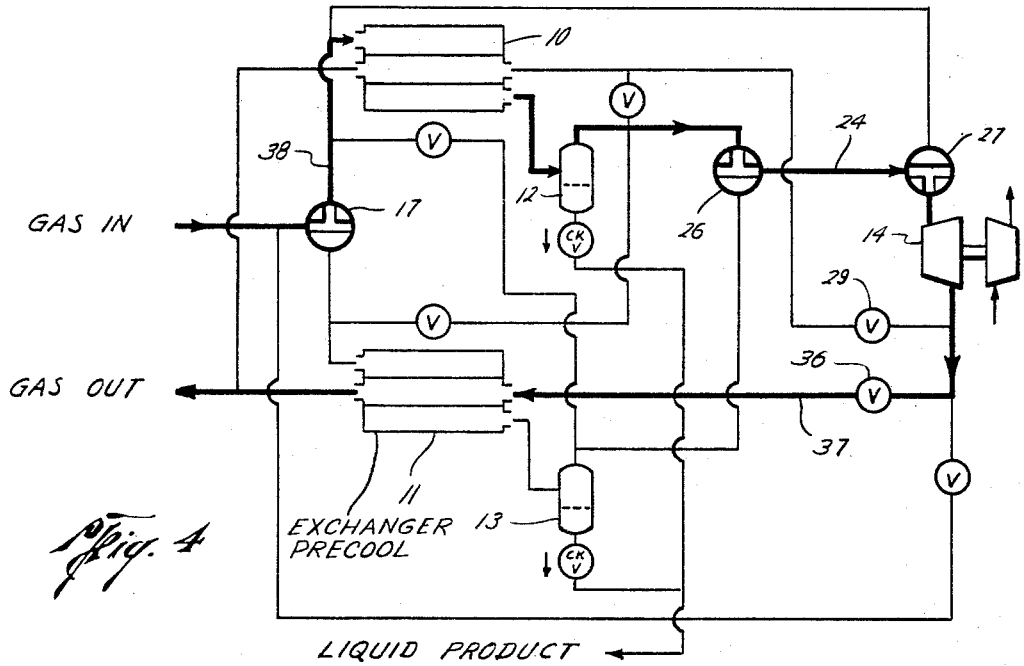

The next step in the process is illustrated in FIG. 4. After heat exchanger 11 has been discharged or defrosted, valve 17 is positioned to pass the gas stream directly to the shell side of heat exchanger 10. Then valve 36 is opened and valve 29 is closed. This diverts the output of turboexpander 14 from the tube side of heat exchanger 10 to the tube side of heat exchanger 11 through line 37. The cold output gas of the turboexpander is now cooling off heat exchanger 11. As soon as heat exchanger 11 is chilled to a temperature below the freezing level of the vapors being removed from the gas stream, the next step in the process can occur.

While chilling exchanger 11, no refrigeration will be supplied to exchanger 10. Normally, however, it will be cold enough and enough frost will be present to cool the incoming gas to a temperature below the freezing level of the condensed vapors for the time required to chill heat exchanger 11. Therefore, this step does not reduce the efficiency of the process.

Figures 5, 6:
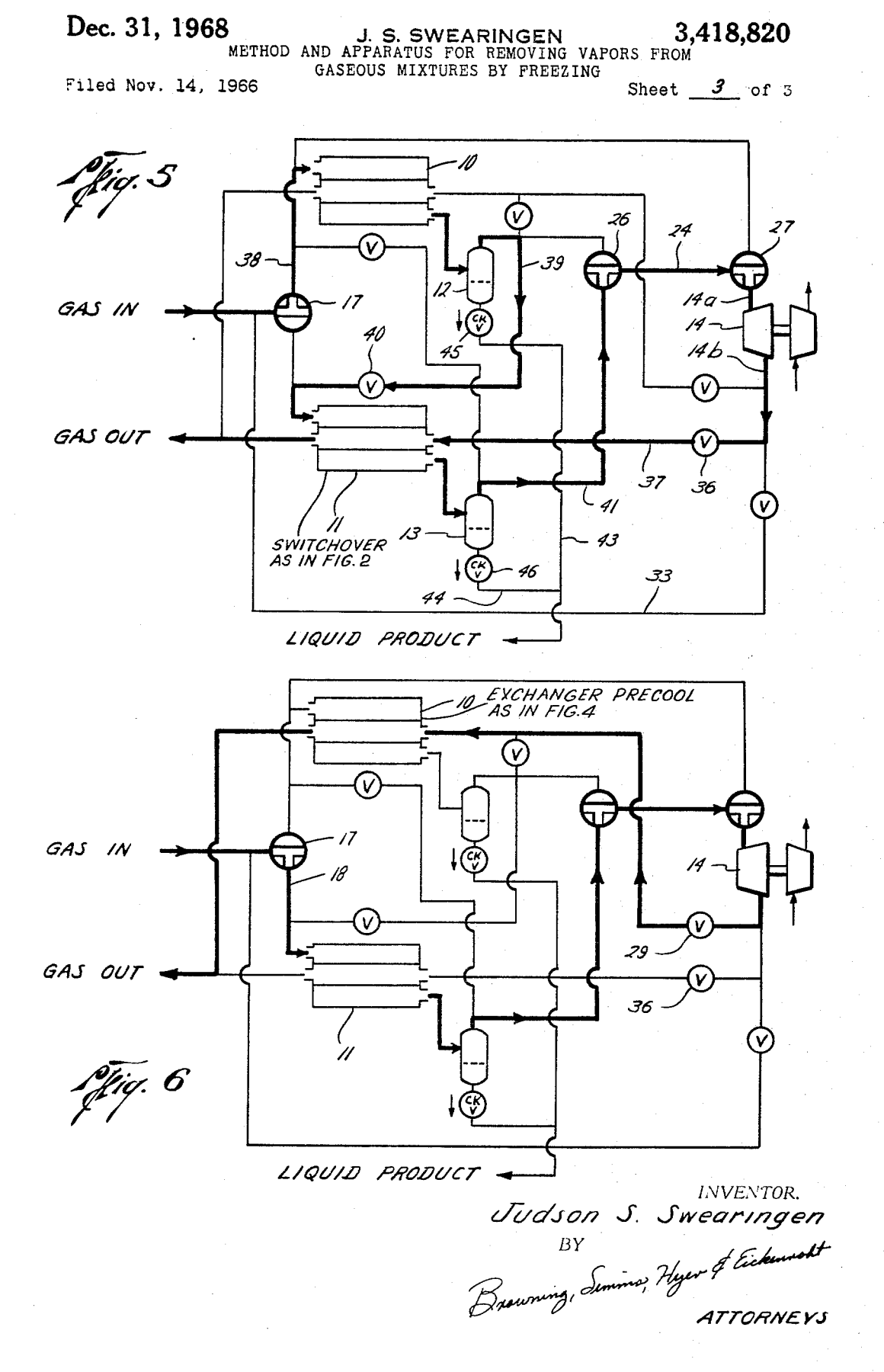

The process is now reversed, as shown in FIG. 5, and the loci of the initial cooling step and the further cooling step are interchanged. The incoming gas stream continues to be directed into the shell side of heat exchanger 10 by three-way valve 17 and line 38. Its purpose now is to warm up this heat exchanger and melt the frost that has been formed on the coils therein. As explained above, at the same time, its own temperature is being dropped and some condensation of the vapors in the gas stream may occur. The liquefied frost and the condensed vapors (if any) are carried to separator 12, where the liquid is removed. The gas stream then flows through line 39 and valve 40 to the shell side of prechilled heat exchanger 11. There the gas stream is further cooled to a temperature below the freezing level of the vapors being removed from the gas stream. A portion of the vapors are deposited as frost on the coils of the heat exchanger and the rest are liquefied and carried by the gas stream into separator 13, where they are removed. The gas stream then flows through line 41, three-way valve 26, line 24, valve 27, and input line 14a to the turboexpander. There the pressure and temperature are reduced and the gas stream is returned back to the tube side of heat exchanger 11 to provide the refrigeration for the process. The gas flows to exchanger 11 from output line 14b through line 37 and valve 36.

This step continues until heat exchanger 10 has been discharged and heat exchanger 11 has been charged with frost. It is then necessary to again chill heat exchanger 10 preparatory to interchanging the loci of frost formation and frost removal by reversing the order that the gas flows through the heat exchangers. Therefore, referring to FIG. 6, the output of turboexpander 14 is diverted from the coil side of heat exchanger 11 to the coil side of heat exchanger 10, by opening valve 29 and closing valve 36. At the same time, the main stream of gas is diverted by three-way valve 17 from the shell side of heat exchanger 10 directly to the shell side of heat exchanger 11 through line 18.

When the temperature of heat exchanger 10 has been reduced sufficiently, the valves will be set as shown in FIG. 2 and the process is repeated.

It is likely that there will be vapors in the gas stream whose freezing point is below the temperature of the heat exchangers in this process. These vapors, however, will largely condense and be removed as liquids. Those that will freeze, of course, will mainly be deposited as frost and then melted back to the liquid state and removed.

In most cases, the process will be removing water along with other vapors. When water is present, hydrates will form and be deposited as frost. By freezing of the hydrate and then subsequently melting it, the hydrate breaks down and releases the gas that had combined with the water to form the hydrate initially. Thus, this gas is returned to the system and not lost.

The liquid collected in separators 12 and 13 is removed therefrom through lines 43, 44, and check valves 45 and 46. If the process is such that frozen solids in the separators 12 and 13 or in their liquid discharge lines is a problem, heating coils 12a and 13a (FIG. 1) are used to raise the temperature of the liquid. The fluid in these coils may be any warm fluid such as the incoming gas stream or a portion of it.

From the foregoing, it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A method of removing vapors from a gaseous stream comprising, while maintaining the gas in substantially unexpanded condition, bringing said gas into heat exchange relation with a frost of previously removed vapors to melt said frost and initially cool the gas, separating the melted frost from the gas, further cooling the gas to condense substantially the remainder of the vapor to be removed at a temperature causing a part thereof to form a frost and the rest a liquid, separating the liquid from the gas to leave a nearly vapor free unexpanded gas, expanding said nearly vapor free gas to reduce its temperature, passing the thus expanded gas into heat exchange relation with the unexpanded gas to effect the aforesaid further cooling step, periodically interchanging the loci of the initial cooling step and the further cooling step to provide at the time of each such interchange a new supply of frost for the initial cooling step to melt, and to provide a locus for the formation of new frost by the further cooling step, and at intervals, passing a stream of uncooled incoming gas to the process in heat exchange relation with the locus of gas expansion before entering the further cooling step of the process to melt any frost which may have collected in the locus of the expansion.

2. The process of claim 1 in which the gas stream flowing to the locus of gas expansion is diverted therefrom and expanded to a lower pressure through a flow restriction to cool the stream while the frost is being melted from the locus of gas expansion and in which said expansion cooled stream is passed in heat exchange rleationship with the unexpanded gas to continue the aforesaid further cooling step.

3. A method of removing component vapors from a gaseous stream, including those that form hydrates, comprising, while maintaining the gaseous stream in substantially unexpanded condition, passing the gaseous stream through the frost-coated pass of a first heat exchanger to lower the temperature of the gaseous stream and to raise the temperature of said frost coated pass to liquefy frost therein that was formed in said pass by freezing component vapors from a gaseous stream previously cooled therein, passing the cooled gaseous stream through a first gas-liquid separator to remove therefrom the liquefied frost from the first heat exchanger, passing the cooled gaseous stream through one pass of a second heat exchanger to further cool the gaseous stream sufficiently to liquefy component vapors therein and to cause at least a portion of the component vapors therein to collect in said pass as frost, passing the further cooled gaseous stream through a second gas-liquid separator to remove the liquefied component vapors leaving a further cooled nearly vapor component free unexpanded gaseous stream, work expanding the further cooled gaseous stream to further reduce its temperature, passing the expanded gaseous stream through the other pass of the second heat exchanger to provide refrigeration for the second exchanger, upon substantially complete removal of the frost from the first exchanger and before reversing the order in which the gas flows through the first and second exchangers, diverting the flow of gaseous feed stream from the first to the second exchanger, cooling the diverted gaseous stream in the second exchanger by heat exchange with frost deposited therein and the cold metal of the heat exchanger, passing the thus cooled gaseous stream through the second separator and then through said work expansion to further cool the gaseous stream, passing the further cooled gaseous stream through another pass of the first exchanger thus precooling the first exchanger, and reversing the exchangers such that the gas flows through the frost containing pass of the second exchanger, the second separator, the precooled pass of the first exchanger, the first separator and then through the work expansion step.

4. The method of claim 3 in which the gas stream is work expanded through an expansion engine to provide useful work and periodically a portion of the incoming gas stream is diverted through the engine before passing through either heat exchanger to melt any frost that may have collected in the expansion engine.

5. Apparatus for removing vapors from a gaseous stream comprising first and second heat exchangers each having an associated liquid-gas separator, means for selectively flowing said gaseous stream into each heat exchanger, flow lines connecting each exchanger with the other through its associated separator whereby the gaseous stream can flow from either heat exchanger through its associated separator to the other exchanger, an expander for reducing the temperature and pressure of the gaseous stream, flow lines connecting each exchanger to the output side of the expander and each separator to the input side of the expander, valve means in the flow lines for directing a gaseous stream through the second exchanger to melt previously deposited frost therefrom and remove it to the associated separator of the second exchanger, then to the first exchanger where the stream is cooled sufficiently to condense vapor from the stream as liquid and frost, then to the associated separator of the first exchanger to remove the liquid therefrom, then through the expander to reduce the temperature of the gaseous stream, and then back to the first exchanger to cool the stream flowing therethrough from the separator associated with the second exchanger sufficiently to cause the aforesaid condensation, and alternating the order in which the gaseous stream flow through the heat exchangers and their associated separators to alternately charge one exchanger with frost while discharging frost from the other said valve means including means for diverting the gaseous stream from the exchanger, discharging frost to the exchanger being charged with frost after the frost has been removed from the former and for diverting the output of the expander from the exchanger being charged with frost to the exchanger discharged of frost to chill the latter preparatory to reversing the order of flow of the stream through the exchangers and means for periodically passing a portion of the incoming gas stream through the expander to remove any frost that may have collected therein.

References Cited

UNITED STATES PATENTS

| 2,113,680 | 4/1938 | De Baufre | 62—13 |
| 2,928,885 | 3/1960 | Newsome. | |
| 3,093,470 | 6/1963 | Melikian et al. | 62—12 XR |
| 3,097,940 | 7/1963 | Houston | 62—12 |
| 3,261,167 | 7/1966 | Carr | 62—12 |
| 3,282,059 | 11/1966 | Maher et al. | 62—12 |

FOREIGN PATENTS 275,633 12/1928 Great Britain.

NORMAN YUDKOFF, *Primary Examiner.*

V. W. PRETKA, *Assistant Examiner.*

U.S. Cl. X.R.

62—39